United States Patent
Appleton et al.

[11] Patent Number: 6,079,826
[45] Date of Patent: *Jun. 27, 2000

[54] METHOD FOR IDENTIFYING CHARACTERISTICS OF CONTACT LENSES

[75] Inventors: William J. Appleton, Rochester; William B. Cronk, IV, Henrietta; Kathleen M. Altobelli, Rochester; Emily Abrams Gabriel, Pittsford; Paul D. Misiti, Rochester, all of N.Y.

[73] Assignee: Bausch & Lomb Incorporated, Rochester, N.Y.

[*] Notice: This patent is subject to a terminal disclaimer.

[21] Appl. No.: 09/054,133

[22] Filed: Apr. 2, 1998

Related U.S. Application Data
[60] Provisional application No. 60/043,908, Apr. 7, 1997.

[51] Int. Cl.[7] .................. G02C 7/04; G02C 7/02
[52] U.S. Cl. .................. 351/160 R; 351/160 H; 351/177
[58] Field of Search .................. 351/160 R, 160 H, 351/161–167, 219, 177; 219/121.6

[56] References Cited

U.S. PATENT DOCUMENTS

| | | | |
|---|---|---|---|
| 4,193,671 | 3/1980 | Erickson et al. | 351/160 H |
| 4,194,814 | 3/1980 | Fischer et al. | 351/160 R |
| 4,256,369 | 3/1981 | Wicherle | 351/160 H |
| 4,268,133 | 5/1981 | Fischer et al. | 351/161 |
| 4,525,044 | 6/1985 | Bauman | 341/160 H |
| 4,976,533 | 12/1990 | Hahn et al. | 351/160 R |
| 5,085,013 | 2/1992 | Ascosi et al. | 451/460 |
| 5,323,192 | 6/1994 | Howland et al. | 351/177 |
| 5,727,987 | 3/1998 | Gottschlad | 451/5 |

FOREIGN PATENT DOCUMENTS

| | | | |
|---|---|---|---|
| WO 95/20483 | 8/1995 | WIPO | B29D 11/00 |
| WO 95/25981 | 9/1995 | WIPO | G02C 7/04 |

OTHER PUBLICATIONS

Patent Abstracts of Japan, vol. 096, No. 11, Nov. 29, 1996 & JP 08194193 (Hoya Corp.), Jul. 30, 1996.

*Primary Examiner*—Georgia Epps
*Assistant Examiner*—Jordan M. Schwartz
*Attorney, Agent, or Firm*—John E. Thomas

[57] ABSTRACT

Contact lenses include a posterior surface including a first identifiable marking, and an anterior surface includes a second identifiable marking different from the first marking, the first and second markings in combination designating the optical correction of the lenses. The lenses are useful in methods where the markings are used to identify characteristics of the lens.

17 Claims, 2 Drawing Sheets

METHOD FOR IDENTIFYING CHARACTERISTICS OF CONTACT LENSES

This application claims the benefit of U.S. Provisional Application No. 60/043,908 filed on Apr. 7, 1997.

BACKGROUND OF THE INVENTION

This invention relates to a method for identifying characteristics of a contact lens, particularly the optical correction of the lens, and lenses useful in the method.

One type of contact lenses is commonly referred to as "spherical contact lenses", i.e., contact lenses designed to provide a spherical optical correction (or "power") to compensate for myopia (nearsightedness) or hypermetropia (farsightedness). Such contact lenses are also designed with fitting parameters, especially lens diameter and effective base curve. Accordingly, a prescription for a spherical contact lens will typically specify spherical correction (power), lens diameter and base curve. Using hydrogel lenses as an example, manufacturers typically market series of spherical hydrogel contact lenses, each series including lenses having common fitting parameters and offering powers in 0.25 or 0.50 diopter increments.

In addition to spherical lenses, there are contact lenses commonly referred to as "toric contact lenses", i.e., contact lenses having a toric optical zone that are designed to correct refractive abnormalities of the eye associated with astigmatism. The toric optical zone provides cylindrical correction to compensate for the astigmatism, with the cylindrical correction commonly referred to as "cylindrical power". The toric surface may be formed in either the posterior lens surface (back surface toric lens) or in the anterior lens surface (front surface toric lens). Whereas spherical contact lenses may freely rotate on the eye, toric contact lenses have some type of ballast to inhibit rotation of the lens on the eye is inhibited so that the cylindrical axis of the toric zone remains generally aligned with the axis of the astigmatism. For example, one or more sections of the lens periphery may be thicker (or thinner) than other sections to provide the ballast. Toric contact lenses are manufactured with a selected relationship (or offset) between the cylindrical axis of the toric optical zone and the orientation of the ballast. This relationship is expressed as the number of degrees (or rotational angle) that the cylindrical axis is offset from the orientation axis of the ballast; toric contact lens prescriptions specify this offset, with toric lenses generally being offered in 5 or 10 degree increments ranging from 0° to 180°.

Since astigmatism requiring vision correction is usually associated with other refractive abnormalities, such as nearsightedness or farsightedness, toric contact lenses are generally prescribed, in addition to cylindrical power and axes offset, with a spherical correction and fitting parameters as for the aforementioned spherical contact lenses. Accordingly, a prescription for toric contact lens will typically specify spherical correction (power), lens diameter, base curve, cylindrical correction, and axes offset.

For the present invention, applicant recognized that it would be desirable to include on contact lenses identifiable markings that can be used to determine characteristics of the lens, particularly the optical correction of the lens. Preferably, the contact lenses are marked so that all relevant lens parameters, including fitting parameters of the lens in addition to optical correction, can be determined readily from the markings. For example, such markings can be used for in-line manufacturing processes, such as verification of lens parameters for product integrity purposes.

U.S. Pat. No. 4,976,533 discloses various prior methods for marking a toric contact lens, the markings being arranged in a manner that the ballast axis is identifiable. As an example, FIG. 2 of U.S. Pat. No. 4,976,533 illustrates a prior art toric contact lens including three visible line segments in a peripheral section of the lens, a first line segment lying on the ballast axis and two line segments arranged symmetrically about the first. Such lenses are useful for measuring the rotation of the lens on the eye, i.e., a practitioner can evaluate the lens when placed on the eye, and use the markings to measure any deviation of the lens from its intended rotational position, and to evaluate whether rotation of the lens on the eye is effectively inhibited as intended.

U.S. Pat. No. 4,194,814 discloses contact lenses that include identifying indicia engraved in a lens surface by subjecting the lens to a beam of laser radiation to form depressions in the lens surface. It is mentioned that the indicia may be machine-readable characters, and that the indicia may be used to identify manufacturer, material lot, and production run of a given lens, or to identify optical characteristics of lenses without actually measuring the lenses.

SUMMARY OF THE INVENTION

This invention relates to a method for identifying characteristics of a contact lens and lenses useful in the method, including the optical characteristics and fitting parameters.

In one aspect, the invention provides a contact lens including a posterior surface and an anterior surface and having a spherical correction, wherein the posterior surface includes a first identifiable marking, and the anterior surface includes a second identifiable marking different from the first marking, the first and second markings in combination designating the spherical correction (or power) of the lens. For toric contact lenses, the first and second markings in combination also designate the cylindrical correction of the lens. According to preferred embodiments, these markings are also indicative of fitting parameters of the lens.

In a second aspect, the invention provides a method of identifying the optical correction of a contact lens. The method comprises: providing the first and second identifiable markings on the posterior and anterior surfaces; assigning combinations of first and second markings to optical correction values, such that each unique combination of first and second markings is assigned to a unique optical correction value, and storing the assigned combinations and optical correction values in a database; reading the first and second markings; and determining the optical correction of the lens by comparing the read first and second markings with the database of combinations of markings and assigned optical correction values. The markings may be read with an optical character recognition system.

In a third aspect, the invention relates to a series of contact lenses comprising contact lenses providing a range of optical corrections, each contact lens comprising a first identifiable marking and a second identifiable marking on at least one surface of the lens, wherein contact lenses in the series providing the same optical correction include the same first and second markings, and contact lenses in the series providing different optical corrections include different combinations of first and second markings.

When the contact lens is a toric lens, it is preferred that the lens includes additional markings indicative of the cylindrical axis and the ballast axis. The positions of the two markings can be measured, and the offset between the cylindrical and ballast axes can be determined by comparing the angular offset of the measured positions of the first and second markings.

DETAILED DESCRIPTION OF PREFERRED EMBODIMENTS

Figure 1:
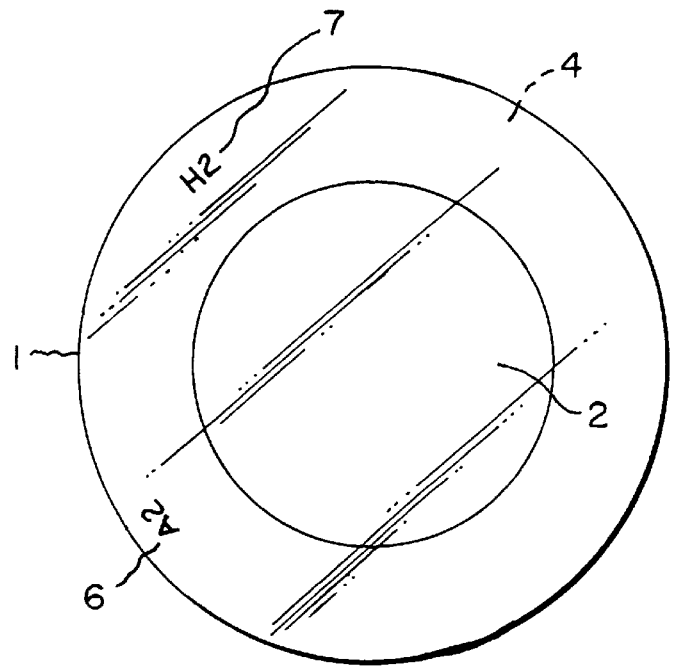
FIG. 1 is a schematic illustration of a contact lens according to an embodiment of the invention.

FIG. 1 schematically illustrates a representative contact lens 1, which for this described embodiment is a spherical lens. Contact lens 1 includes central optical zone 2. Anterior surface 4 includes a first marking 6. The posterior surface includes a second marking 7 which, as seen in FIG. 1, is visible from the anterior surface. Preferably, first and second markings 6,7 are formed in or near the periphery of the lens surfaces so that they do not interfere with a wearer's field of vision.

It is preferred that the markings are molded directly in the lens. A suitable method is cast molding where the lens is cast between two mold sections, an illustrative mold assembly 25 being shown in FIGS. 4 and 5. The mold assembly includes posterior mold 30 having a posterior mold cavity defining surface 31 which forms the posterior surface of the molded lens, and anterior mold 40 having an anterior mold cavity defining surface 41 which forms the anterior surface of the molded lens. When the mold sections are assembled, a mold cavity 32 is formed between the two defining surfaces that corresponds to the desired shape of the contact lens molded therein. Each of the mold sections is injection molded from a plastic resin in an injection molding apparatus.

Figure 4:
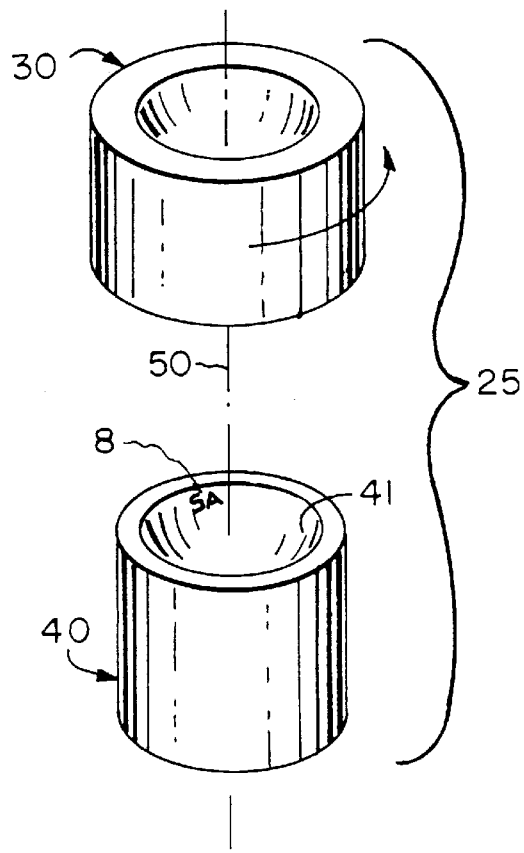
FIG. 4 is a schematic exploded view of one embodiment of a mold assembly for cast molding contact lenses.

Depressions corresponding to the desired first and second markings are first formed in the tooling used to injection mold the mold sections. These depressions can be formed in the tooling by laser ablation, photochemical etching or machining. Accordingly, when the mold sections are injection molded from the tooling, raised portions corresponding to the depressions in the tooling will be replicated in surfaces 31,41 (raised portion 8 on anterior surface 41 is illustrated in FIG. 4); then, when contact lenses are cast in the mold sections, depressions corresponding to the desired markings are replicated in the lens surfaces.

As known in the art, the geometries of the posterior and anterior lens surfaces in the optical zone are designed to provide the contact lens with a desired spherical correction (or power). In practice, for the aforementioned cast molding method, the invention can be implemented by assigning a unique anterior marking to each unique anterior mold section (and anterior tooling therefor), and a unique posterior marking to each unique posterior mold (and posterior tooling therefor); in turn, when lenses are cast in the molds, this results in a unique combination of anterior and posterior markings for each power correction. In other words, the geometries of the anterior and posterior surfaces, in combination, will be unique for each power; even if the same anterior mold type is used with multiple posterior mold types (or vice versa) to make lenses with different powers, each power will still have a unique combination of anterior and posterior markings.

Subsequent to assembling the mold sections, the monomer mixture is polymerized, such as by exposure to UV light or heat, followed by disassembling the mold assembly and removing the molded lens therefrom. Other processing steps which may be included, depending on the specific process, include lens inspection, hydration in the case of hydrogel contact lenses, and lens packaging.

As mentioned, markings 6,7 in combination are unique to the spherical correction of the lens. Accordingly, each combination of first and second markings can be assigned to a spherical correction value, such that each unique combination of first and second markings is assigned to a unique optical correction value, and this "matrix" of assigned combinations and spherical correction values can be stored in a database. While markings can be read by a person who then references the database, it is preferred that markings 6,7 are machine readable, so that the first and second markings can be read with an automated optical character recognition system, whereby the spherical correction of the lens can then be determined by comparing the read first and second markings with the database of combinations of markings and assigned spherical correction values. Several types of such systems are commercially available.

It will be appreciated by those skilled in the art that for the described cast molding method, each unique combination of markings 6,7 will not only be unique to a certain spherical correction, but will also be unique to fitting parameters of the lens, i.e., lens diameter and effective base curve. By incorporating this information in the database, one can also correlate the fitting parameters of the lens, in addition to spherical correction, with the assigned combination of first and second markings.

By assigning unique markings to the anterior and posterior molds and casting lenses in the molds, the invention is much simpler to implement than the laser ablation methods described in U.S. Pat. No. 4,194,814. And while U.S. Pat. No. 4,194,814 suggests that optical characteristics of the lens can be identified in a readable indicia on the lens, the present invention offers improved reliability over the method of U.S. Pat. No. 4,194,814 by avoiding potential operator errors. In other words, whereas the method suggested by U.S. Pat. No. 4,194,814 relies on an operator to assign markings to lenses that are indicative of the lens optical characteristics, casting markings directly in the lens avoids the need for an operator to assign markings to the lenses. It will also be appreciated that the present invention is more suitable for in-line manufacturing processes.

According to an especially preferred embodiment of the invention, the lenses are formed by a cast molding process according to the method described in U.S. Pat. No. 5,601,759, the disclosure of which is incorporated herein by reference. This improved method of cast molding contact lenses involves molding a series of contact lenses having a range of optical powers using a matrix of posterior and anterior molds having varying molding surfaces. By selectively combining anterior mold types with posterior mold types, such that the optical powers vary among the mold types while common fitting parameters are maintained, the unique number of tools required is reduced.

Figure 2:
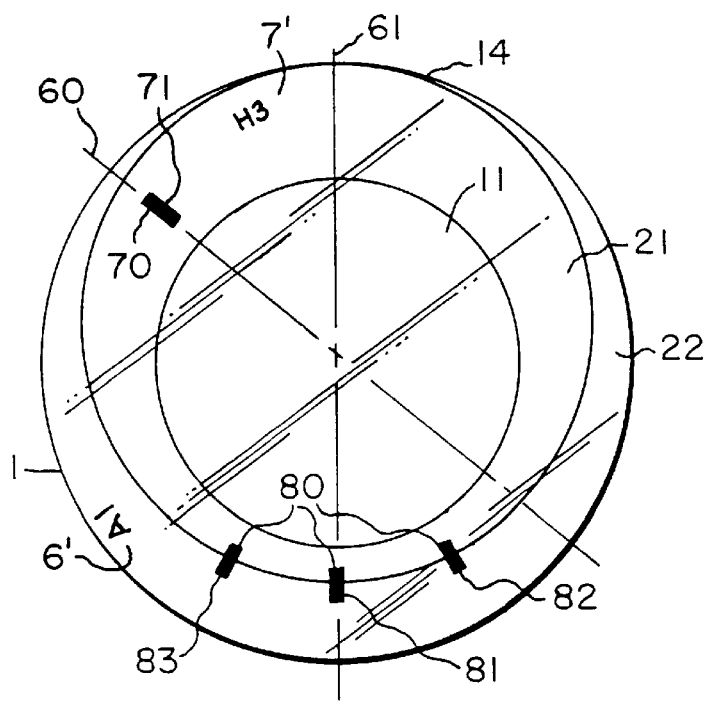
FIGS. 2 and 3 are a schematic illustration of a toric contact lens according to preferred embodiments of the invention.
Figure 3:
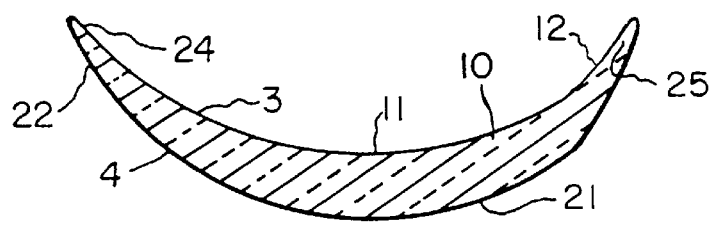

Toric contact lenses can also be marked as in the embodiment shown in FIG. 1, wherein the first and second markings in combination can be used to designate spherical and cylindrical corrections, but FIGS. 2 and 3 schematically illustrate preferred embodiments for toric contact lenses.

In toric contact lens 10, central zone 11 of posterior surface 3 is toric, i.e., this zone has a toric surface that provides the desired cylindrical correction. Posterior surface 3 may optionally include at least one peripheral curve 12 surrounding the central toric zone 11. For the described embodiment, central zone 21 of anterior surface 4 is spherical, and the spherical curve is matched with central zone 11 to provide the desired spherical correction to the lens. Anterior surface 4 may optionally include at least one peripheral curve 22 surrounding central zone 21.

Lens 10 is provided with ballast, i.e., the lens periphery is designed so that the lens maintains a desired rotational orientation on the eye. As one example of ballast, schematically shown in FIG. 4, peripheral section 24 may have a different thickness than an opposed peripheral section 25 of the lens periphery. With reference to FIG. 2, the ballast is oriented about axis 61. (Hereinafter, for purposes of convenience, this axis will be referred to as the "ballast axis".) As discussed above, toric contact lens prescriptions define the offset of ballast axis 61 from the cylindrical axis 60 of the toric zone by a selected rotational angle. (As used herein, the "offset" is inclusive of rotational angles of 0 degrees or 180 degrees, wherein the cylindrical axis is coincident with the ballast axis.)

Lens 10 includes markings 6',7', which in combination are indicative of the spherical correction provided by the lens, similar to markings 6,7 in the embodiment illustrated in FIG. 1. Additionally, markings 6',7' in combination can also be used to determine the cylindrical correction of the toric lens, since the geometries of the anterior and posterior surfaces, in combination, will be unique for each cylindrical correction also. Thus, even if the same anterior mold type is used in combination with multiple posterior mold types to make lenses with different powers and/or different cylindrical corrections, each power/cylindrical correction will be based on a unique combination of anterior and posterior markings.

Lens 10 can be manufactured by a cast molding method, where markings 6',7' are molded directly into surfaces of the lens. A unique anterior marking is assigned to each unique anterior mold type (and anterior tooling therefor), and a unique posterior marking to each unique posterior mold type (and posterior tooling therefor); in turn, when lenses are cast in the molds, this results in a unique combination of anterior and posterior markings for each spherical correction and cylindrical correction. Additionally, each combination of anterior and posterior markings will also be unique to fitting parameters of the lens, i.e., lens diameter and effective base curve. By incorporating this information in the database, one can also correlate the fitting parameters of the lens, in addition to optical correction, with the assigned combination of first and second markings. Accordingly, for toric contact lenses, one can easily ascertain spherical correction, cylindrical correction, lens diameter and base curve from the combination of markings 6',7.

In addition to markings 6',7', it is preferred that toric contact lens 10 includes markings that are indicative of the axes offset, i.e., the offset between ballast axis 61 and cylindrical axis 60. According to the embodiment shown in FIG. 2, lens 10 includes a third identifiable marking 70 aligned with cylindrical axis 60, and a fourth identifiable marking 80 aligned with ballast axis 61. For the illustrative embodiment, third marking 70 has the form of a visible line segment 71 lying on cylindrical axis 60 and in a peripheral section of the posterior surface. Fourth marking 80 has the form of a visible line segment 81 lying on ballast axis 61 and a pair of visible line segments 82,83 arranged symmetrically about ballast axis 61, each in a peripheral section of the anterior surface.

The axes offset of a given toric lens can be ascertained by measuring positions of the third and fourth markings with respect to each other, and comparing the angular offset of the measured positions of the markings. As for the first and second markings, these additional markings may be machine readable, thereby enabling manufacturing inline inspection of the axes offset for a given contact lens. It will be appreciated that the exact configuration or shape of the markings is not critical, so long as the markings are indicative of the cylindrical axis and the ballast axis.

Figure 5:
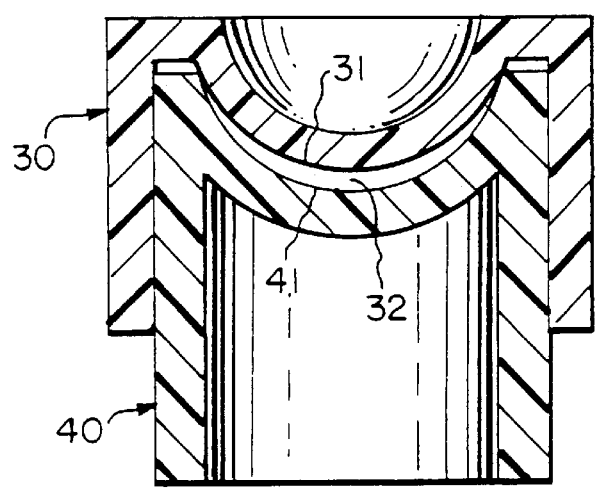
FIG. 5 is a schematic cross-sectional view of an assembled mold assembly shown in FIG. 4.

This embodiment is also suitable for the cast molding of contact lenses using a mold assembly as shown in FIGS. 4 and 5. Posterior mold cavity defining surface 31 has a toric central zone for forming a toric posterior surface of the toric contact lens that has a cylindrical axis, and anterior mold cavity defining surface 41 has a configuration that will provide ballast to a lens molded in molding cavity 32. Surfaces 31, 41 may also include curves for forming desired peripheral curves on the lens, and the central zones of surfaces 31, 41 may be designed to provide a desired spherical correction to the molded toric lens.

Depressions corresponding to markings 7',6' are formed in the tooling for injection molding of the posterior and anterior mold section surfaces 31,41, respectively. Additionally, depressions corresponding to markings 70,80 are formed in the tooling for injection molding of the posterior and anterior mold section surfaces 31,41, respectfully, the depression corresponding to marking 70 being aligned with the cylindrical axis of the posterior toric zone, and the depression corresponding to marking 80 being aligned with the ballast axis in the anterior surface. The depression in the anterior tooling results in corresponding raised portions being replicated in anterior mold section surface 41. The third and fourth markings 70,80 are then replicated on the lens from the molding process.

The invention is especially suitable for cast molding according to the process for casting toric contact lenses described in U.S. Pat. No. 5,611,970, the disclosure of which is incorporated herein by reference. According to this method, when molding toric contact lenses, the rotational alignment of the anterior and posterior mold sections is adjusted to correspond with the selected offset between the cylindrical axis and the ballast. More specifically, after depositing a curable mixture of polymerizable monomers in anterior mold section 40, posterior mold section 30 may be rotated about axis 50 until alignment of this mold section is adjusted with respect to anterior mold section 40 at the selected rotational position. The mold sections are then assembled, or brought fully together, to assume the configuration shown in FIG. 5 while maintaining the selected rotational position. Alternately, anterior mold section 40 may be rotated about axis 50 until alignment is adjusted at the selected rotational position, followed by assembling the mold sections while maintaining the selected rotational position. Either of the mold sections may include a notch (or protrusion) which is engageable with a protrusion (or notch, respectively) on a support member of the cast molding system, or other means to ensure that this mold section is aligned at a known position with respect to the support member, and rotation of the mold sections with respect to one another can then be controlled to ensure the desired rotational position is maintained. An advantage of this cast molding method is that it minimizes the unique number of tools to cast mold toric lenses having different axes offsets, since the same mold sections can be used to mold lenses having the same power/cylindrical correction but different axes offsets.

Although certain preferred embodiments have been described, it is understood that the invention is not limited thereto and modifications and variations would be evident to a person of ordinary skill in the art. As examples, this invention is applicable for toric lens ballast types other than that shown in FIG. 3, or the lens may have the toric zone in the anterior surface. Additionally, other forms of markings may be used so long as the markings are visible or machine-readable.

What is claimed is:

1. A contact lens including a posterior surface and an anterior surface and having a spherical correction, wherein the posterior surface includes a first identifiable marking, and the anterior surface includes a second identifiable marking different from the first marking, the first and second markings in combination designating the power of the lens.

2. The contact lens of claim 1, wherein the first and second markings are machine readable.

3. The contact lens of claim 1, wherein the first and second markings in combination also designate lens diameter and effective base curve of the lens.

4. The contact lens of claim 1, wherein the contact lens is a toric contact lens including a toric zone having a cylindrical axis and a ballast having a ballast axis.

5. The contact lens of claim 4, wherein the first and second markings in combination also designate cylindrical correction of the lens.

6. The contact lens of claim 4, wherein a surface of the lens further comprises a third identifiable marking that is aligned with the cylindrical axis.

7. The contact lens of claim 6, wherein a surface of the lens further comprises a fourth identifiable marking that is aligned with the ballast axis.

8. The contact lens of claim 7, wherein the third and fourth markings are machine readable.

9. The contact lens of claim 1, wherein the first and second markings are cast directly in surfaces of the lens.

10. A method of identifying the optical correction of a lens comprising:

providing a first identifiable marking on a posterior surface of the lens and providing a second identifiable marking different from the first marking on an anterior surface of the lens;

assigning combinations of first and second markings to optical correction values, such that each unique combination of first and second markings is assigned to a unique optical correction value, and storing the assigned combinations and optical correction values in a database;

reading the first and second markings; and determining the optical correction of the lens by comparing the read first and second markings with the database of combinations of markings and assigned optical correction values.

11. The method of claim 10, wherein the first and second markings are read with an automated optical character recognition system.

12. The method of claim 10, wherein the lens is a spherical contact lens and each unique combination of first and second markings is assigned to a unique spherical correction value, and the spherical correction of the lens is determined by reading the first and second markings and comparing the read markings with a database including assigned spherical correction values.

13. The method of claim 10, wherein the lens is a toric contact lens including a toric zone having a cylindrical axis and a ballast having a ballast axis.

14. The method of claim 13, further comprising:

providing a third identifiable marking on a surface of the lens that is aligned with the cylindrical axis, and, providing a fourth identifiable marking on a surface of the lens that is aligned with the ballast axis.

15. The method of claim 10, wherein the first and second markings are cast directly in surfaces of the lens.

16. The method of claim 14, wherein the first, second, third and fourth markings are cast directly in surfaces of the lens.

17. A method of identifying an offset between the cylindrical axis of the toric zone and the ballast axis of a toric contact lens, said method comprising:

providing a first identifiable marking on a surface of the lens that is aligned with the cylindrical axis, and providing a second identifiable marking on a surface of the lens that is aligned with the ballast axis;

measuring positions of the first and second markings with an automated optical character recognition system; and determining the offset between the cylindrical and ballast axes by comparing the angular offset of the measured positions of the first and second markings.

* * * * *